March 30, 1971  F. G. BROCKMAN ET AL  3,573,208
METHOD OF MANUFACTURING FERRITES OF HIGH RESISTIVITY
Filed Sept. 19, 1968  7 Sheets-Sheet 1

SCALES IN
"NOMINAL"
MOL PERCENTAGES
NiO 15.8 TO 17.8
ZnO 33.5 TO 35.5
$Fe_2O_3$ 48.7 TO 50.7

INVENTORS
FRANK G. BROCKMAN
KENNETH E. MATTESON
BY
AGENT

United States Patent Office 3,573,208
Patented Mar. 30, 1971

3,573,208
METHOD OF MANUFACTURING FERRITES OF HIGH RESISTIVITY
Frank G. Brockman, Dobbs Ferry, and Kenneth E. Matteson, Mahopac, N.Y., assignors to U.S. Philips Corporation, New York, N.Y.
Filed Sept. 19, 1968, Ser. No. 760,872
Int. Cl. C04b 35/30
U.S. Cl. 252—62.62
5 Claims

ABSTRACT OF THE DISCLOSURE

A method of manufacturing ferrites of high resistivity and $\mu Q$ product by accurate control of the composition. In this method two ferrites of approximately the same composition, but differing slightly in stoichiometry, are blended to form a composition of optimum stoichiometry for maximum resistivity and $\mu Q$ product.

The invention relates to a method of manufacturing ferrites having optimum resistivities and $\mu Q$ products.

The term "ferrite" as used throughout this specification and claims is defined as a compound of $Fe_2O_3$ and an oxide of a bivalent metal such as nickel, manganese, cobalt, copper, zinc, and cadmium. This term also includes compounds of $Fe_2O_3$ and two or more such oxides.

Many of these ferrites are ferromagnetic, exhibiting large values of initial permeability, low losses, particularly because their resistivities are very high, and are especially useful as core materials in electrical devices. One figure or merit for such materials is the product, $\mu Q$ in which $\mu$ is the permeability and $Q = \omega L/R$ where L is the inductance of a coil wound on an annular core of such material, R the loss resistance of the material, and $\omega$ the angular frequency at which L and R are measured.

Although it is generally known that ferrites have resistivities of several million ohm-cm., and high permeabilities, investigations have shown that the resistivity as well as the product $\mu Q$ are critically dependent upon the composition of the ferrite as well as the conditions under which the ferrite is prepared. Moreover, these values were not always reproducible.

A principal object of the invention therefore is to provide a method for preparing ferrite compositions having optimum values of resistivity and $\mu Q$ product.

This and further objects of the invention will appear as the specification progresses.

It has been found that duplicate test bodies of certain ferrites prepared under substantially identical conditions from the same materials had different values of resistivity and $\mu Q$. By eliminating processing variables one at a time, it was found that there was an unusual sensitivity to compositional changes, or stoichiometries within a very narrow range, particularly of the ferric oxide component. Further investigation showed that the optimum properties were obtainable by blending batches of the material to control the composition within very narrow limits and by careful control of the temperature to which the constituents forming the ferrite were heated. When this was done and a series of samples of slightly different molar ratios were measured, a pronounced maximum in the $\mu Q$ product and also of the resistivity occurred at one particular molar ratio. Having established this particular molar ratio it was then possible to prepare this optimum material by adjusting the molar ratios of the raw materials to correspond to this optimum molar ratio.

In the case of nickel-zinc ferrites which are prepared by mixing NiO, ZnO and $Fe_2O_3$ in such proportions that the $Fe_2O_3$ constitutes approximately 50 mol percent of the mixture, an unusual sensitivity to changes in the quantity of $Fe_2O_3$ was found. A very slight excess or deficiency of this component was found to have a profound effect on the values of the resistivity and $\mu Q$ product. However, it should be understood that the invention is not limited to nickel-zinc ferrites but relates to other ferrites, particularly cobalt-containing ferrites.

The invention will be described further with reference to the accompanying drawing in which.

This invention will also be described in connection with the following examples:

EXAMPLE I

Two compositions were prepared by weighing out the proper amounts of raw materials. In these compositions the NiO/ZnO ratio was 32/68.

| | Percentage Purity | Mol percent | Actual weight, gms. |
|---|---|---|---|
| Composition No. 1, material: | | | |
| Nickelous carbonate | 92.82 | 16.32 | 25.05 |
| Zinc oxide | 98.81 | 34.68 | 34.27 |
| Ferric oxide | 99.68 | 49.00 | 94.21 |
| Composition No. 2, material: | | | |
| Nickelous carbonate | 92.82 | 16.00 | 24.56 |
| Zinc oxide | 98.81 | 34.00 | 33.60 |
| Ferric oxide | 99.68 | 50.00 | 96.13 |

It should be pointed out that these raw materials were of reagent grade and that the departures from 100% purity are not due to contamination with other metals, but are due to occluded moisture and variations in the anions such as hydroxyl and carbonate intermixtures. For instance nickelous carbonate is a compound of uncertain composition being a complex of nickel carbonate, nickel hydroxide with water of hydration. The raw materials were analyzed chemically for the cation content. The nickelous carbonate was shown to be free of detectable amounts of cobalt.

The raw materials were throughly mixed in a Waring Blendor using 300 cc. of alcohol as the mixing fluid. After mixing the alcohol was removed by evaporation and the mixture was dried at about 100° C. The dried powder was mixed and passed through a No. 30 sieve. The mixture was calcined at 900° C. for 1 hour on temperature. After cooling to room temperature, the calcined powder was ball milled. The conditions of the milling were:

Mill size—480 cm.³
Ball size—⅜ inch
Number of balls—220
Weight of calcined powder—130 grams
Volume of alcohol—144 cm.³
R.p.m.—108
Milling time—20.0 hours After this milling, the alcohol was removed from the powder by evaporation and the powder was dried at about 100° C.

This was carried out for the two compositions so that there resulted two powders with "nominal" compositions:

| | "Nominal" mol percent | | |
|---|---|---|---|
| | NiO | ZnO | $Fe_2O_3$ |
| Composition No. 1 | 16.32 | 34.68 | 49.00 |
| Composition No. 2 | 16.00 | 34.00 | 50.00 |

Figure 1:
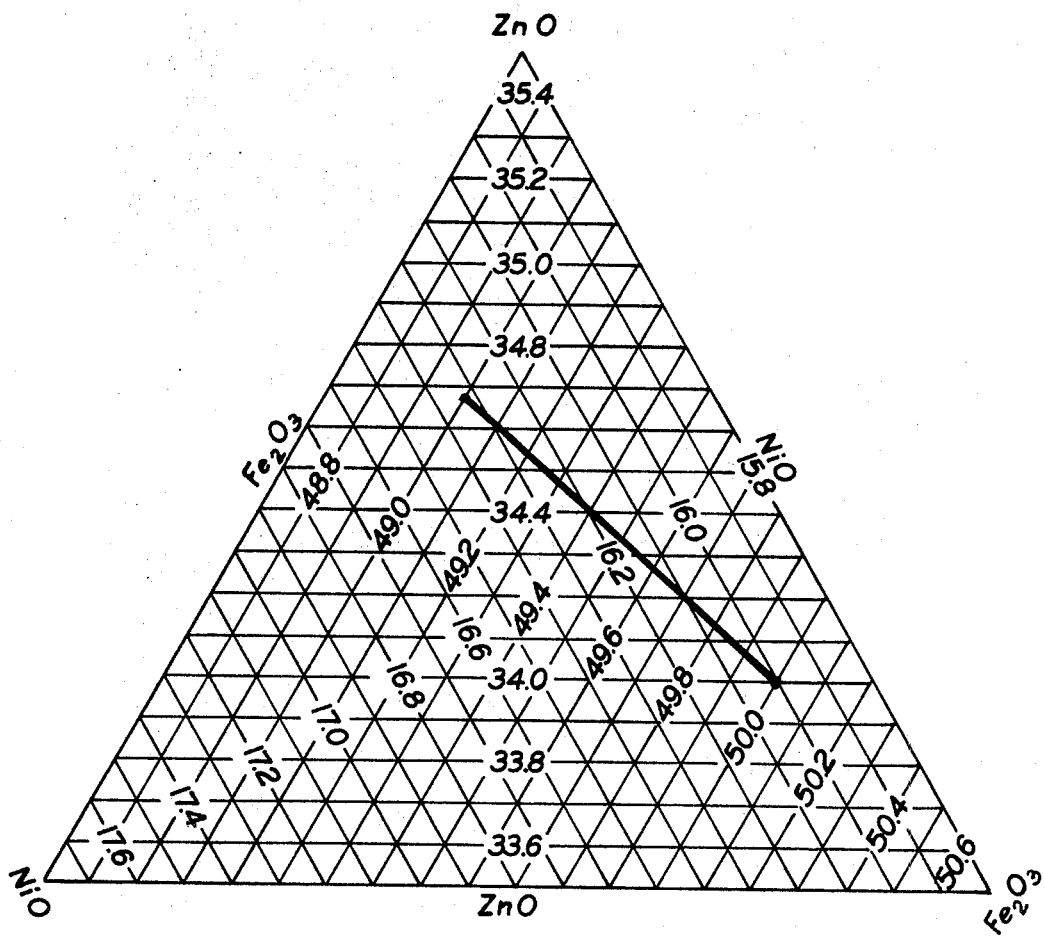
FIG. 1 is a triaxial diagram of nickel-zinc ferrite compositions according to the invention.

The Fine Scale Blending Technique was applied in the following manner: a weighed amount of Composition No. 1 was thoroughly mixed with a weighed amount of Composition No. 2. The weights were taken such that the sum of the weights of the two was 10 grams, and the relative weights were such that "nominal" mol percentages of ferric oxide from 49.00 to 50.00 resulted. FIG. 1 is a triaxial composition diagram on an expanded scale. The line drawn on the diagram includes all possible "nominal" compositions.

By "nominal" we mean the molar percentages calculated from the amounts of the raw materials initially taken and not the true molar percentages of the finished material. The true molar percentages can differ from the "nominal" molar percentages because the absolute accuracy of the usual chemical assays of the raw materials is not better than about 5 parts in 1000 and because the technology of the manufacture of ferrites results in an increase in the content of ferric oxide due to the ball milling. Details of this are described under Example II.

Test samples were prepared from these mixtures. The samples were pressed in the forms of toroids (die size: 3.49 cm. O.D., 2.54 cm. I.D.). The binder used was distilled water, 15 drops to 10 grams of powder. Pressing was carried out with a total force of 10,500 lbs. (about 1,000 kg./cm.$^3$). After firing the test toroids were about 2.9 cm. O.D., 2.1 cm. I.D., 0.62 cm. height.

Firing was carried out with the test toroids placed on platinum. The furnace temperature was controlled through a cam-actuated program. The rate of heating was such that from room temperature to top temperature required about 3¾ hours. The on-temperature time was 10 hours. The samples were allowed to cool to room temperature at the cooling rate of the furnace (in 19 hours the temperature dropped to about 170° C.). A thermocouple was placed near the samples during the firing. The temperature registered by this thermocouple was 1145° to 1135° C. The temperature "over shot" at the beginning of the 10 hour on-temperature time to the higher figure and then equilibrated to the lower figure in 3 hours.

A toroidal winding of insulated copper wire was applied to each test sample and the resulting inductor was measured on a Q meter at 0.15 mc./s. From the measurements, the permeabilities and the $\mu Q$ products for the various samples were determined. The results are shown in FIG. 2.

Figure 3:
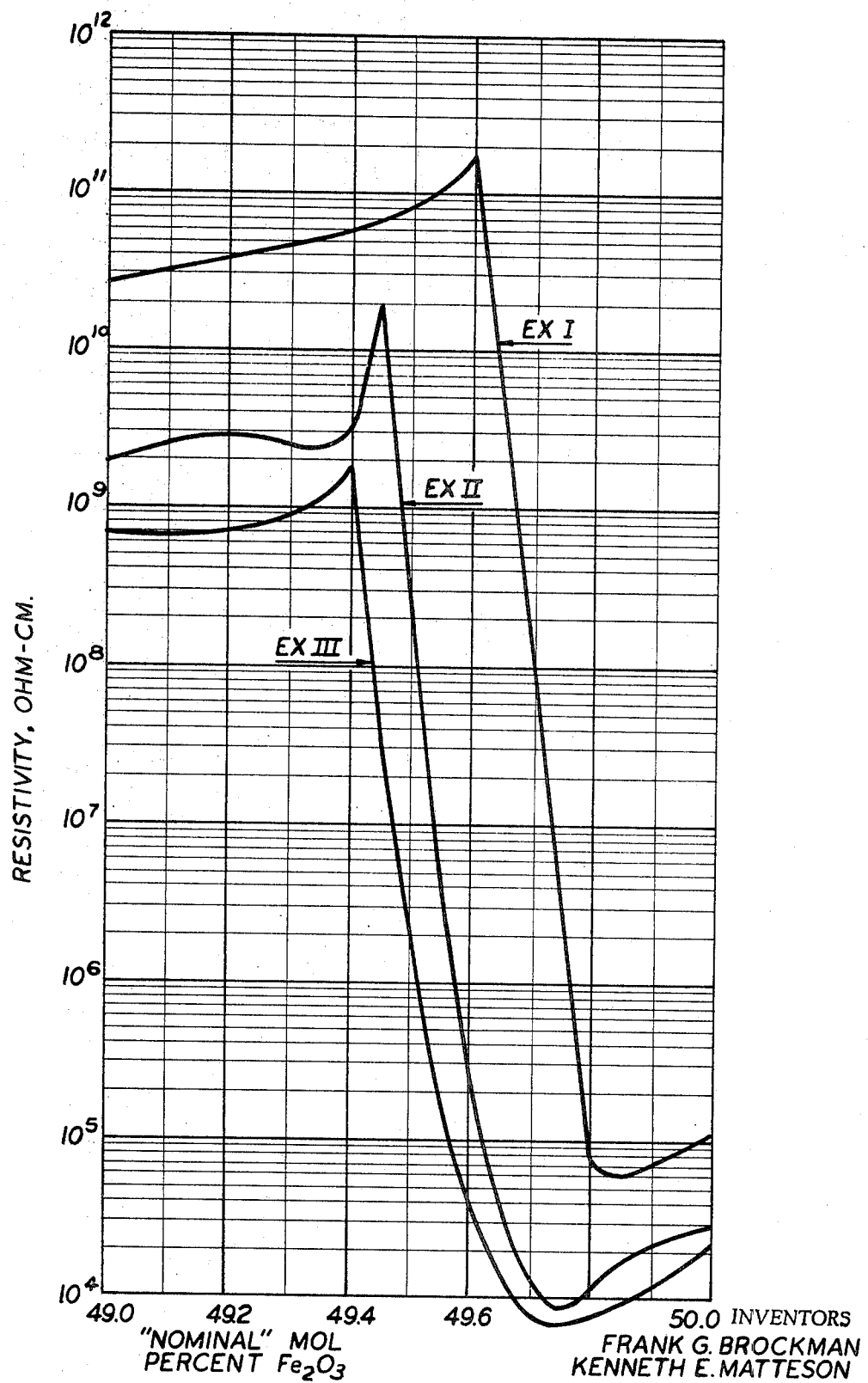
FIG. 3 shows the relationship between resistivity and composition.
Figure 4:
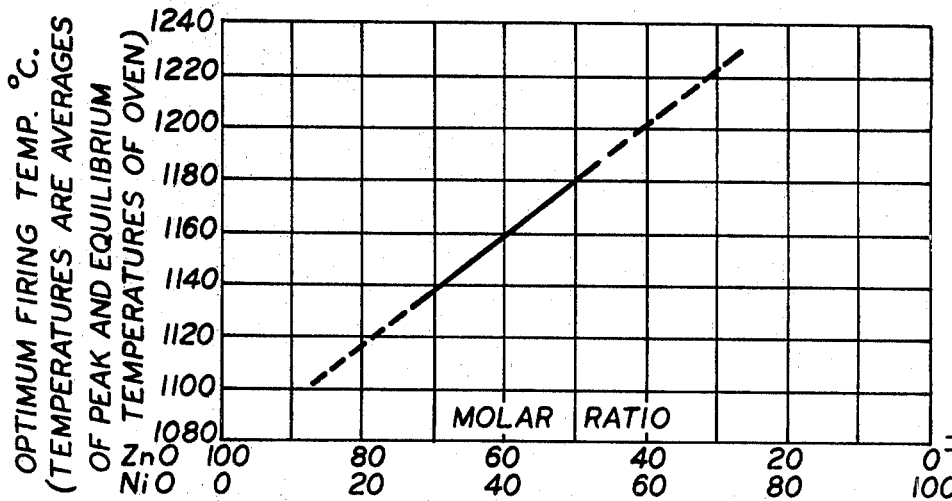
FIG. 4 shows the relationship between firing temperature and composition.

After removing the winding from each sample electrodes of indium-gallium were applied to the flat, end surfaces of each toroid. The electrical resistance between the two electrodes was measured and from the resistance and the dimensions of the sample, the resistivity was determined for each sample. FIG. 3 shows these results.

Figure 2:
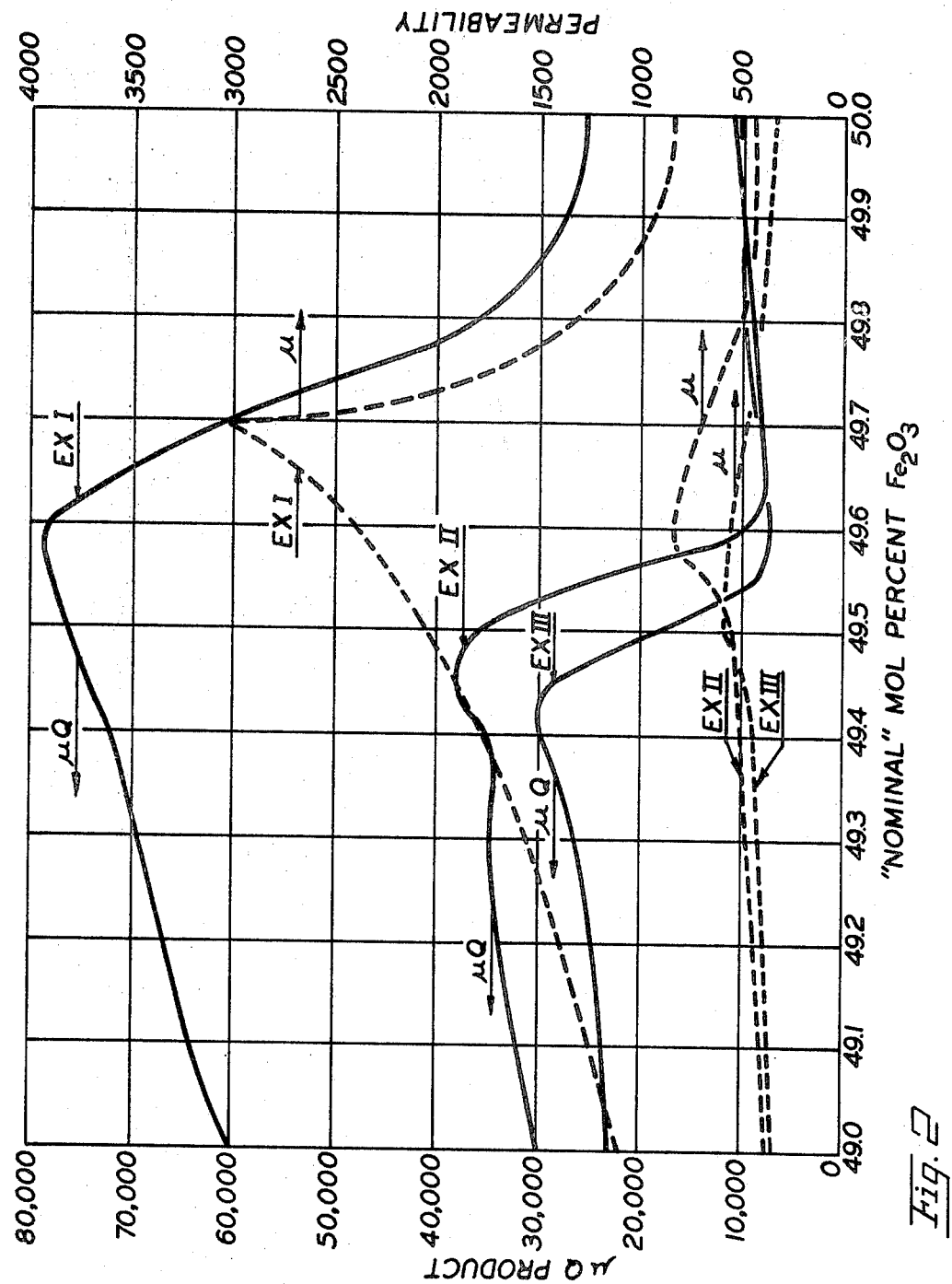
FIG. 2 shows the relationship between permeability ($\mu$) and $\mu Q$ product, and composition.

From FIGS. 2 and 3 it will be evident that a pronounced maximum in resistivity and in $\mu Q$ occurs at a "nominal" mol percent of ferric oxide at 49.60. The resistivity at this optimum is unusually high for this technical composition and it is all the more noteworthy because the fired density of samples of this "nominal" mol percent of ferric oxide average 5.15 grams per cm.$^3$. It is common practice to under-sinter technical ferrites of this type. Under-sintering results in lower densities. Because of the limited contact between particles in low density ferrites, resistivity measurements can be unrealistically high. Even under these circumstances, it is common practice to set a resistivity specification as low as $10^5$ ohm cm.

Another important part of this invention is the discovery that for this composition, an appreciable increase in the final firing temperature causes a decrease in the quality of the product. On the other hand, a similar decrease in the firing temperature, while it reduces the quality somewhat, is not as serious as an increase in this temperature. The optimum firing temperature is therefore 1145° C. to 1135° C. for this composition. Furthermore, it was found that samples prepared at 1145° to 1135° C. are more uniform than those prepared at other temperatures. This was discovered when the end surfaces of the test samples were ground off and the resistivities were measured before and after grinding. For samples of 49.60 "nominal" mol percent ferric oxide (the optimum as disclosed by FIGS. 2 and 3) fired at 1145° to 1135° C., the resistivity did not change as the end surfaces were removed. However, fired at 1175° to 1165° C., the resistivity decreased markedly, fired at 1112° to 1102° C. the the resistivity increased somewhat. The above facts shown in Table I.

TABLE I

[Effect of firing temperature on samples of 49.60 "nominal" mol percent ferric oxide]

| | | | | Resistivity | |
|---|---|---|---|---|---|
| | $\mu$ | Q | $\mu Q$ | Before removing surfaces | After removing surfaces |
| Firing temperature, ° C.: | | | | | |
| 1112-1102 | 1,336 | 48.7 | 65,060 | $6.6 \times 10^8$ | $3.3 \times 10^9$ |
| 1145-1135 | 2,418 | 32.3 | 78,100 | $4.1 \times 10^{11}$ | $4.8 \times 10^{11}$ |
| 1175-1165 | 2,969 | 16.0 | 47,510 | $4.8 \times 10^8$ | $3.6 \times 10^6$ |

While we do not in any respect wish the following explanation of this behavior to be a part of this invention, we believe that the uniform resistivity of this material, when fired at 1145° to 1135° C., is an indication that this temperature represents the temperature at which this particular ferrite composition is in equilibrium with the partial oxygen pressure in air.

EXAMPLE II

The nickel zinc ferrite in this example had a nickel to zinc ratio higher than that in Example I. It was also modified by the inclusion of a small amount of cobalt ferrite. The two compositions prepared for the "Fine Scale Blending Technique" were:

| | "Nominal" mol percent | | | |
|---|---|---|---|---|
| | CoO | NiO | ZnO | $Fe_2O_3$ |
| Composition No. 1 | 0.1 | 21.885 | 29.015 | 49.00 |
| Composition No. 2 | 0.1 | 21.46 | 28.44 | 50.00 |

Blends of the two compositions produce compositions which, on the triangular coordinate mol percent plot, CoO, $Fe_2O_3$ and $(Ni_{.43}Zn_{.57})O$ lie on the (constant) 0.1 mol percent CoO line, between the one extreme, $Fe_2O_3$ 50 mol percent, $(Ni_{.43}Zn_{.57})O$, 49.9 mol percent and the other extreme, $Fe_2O_3$ 49 mol percent, $(Ni_{.43}Zn_{.57})O$, 50.9 mol percent.

The toroids were measured in the same manner as in Example I, excepting that the permeabilities and the $\mu Q$'s were measured at 1.5 mc./s. FIG. 3 shows the resistivity as a function of the "nominal" mol percent of ferric oxide. FIG. 2 shows the $\mu Q$ product (at 1½ mc./s.) and the permeability as functions of the "nominal" mol percent of ferric oxide. As in Example I (Ni/Zn ratio 32/68), here also the resistivity and the $\mu Q$ product both occur at a particular "nominal" mol percent ferric oxide.

Thus, a special feature of the invention is that the concentration of ferric oxide need not be precisely known. An important factor in the uncertainty of the mol percentage of ferric oxide in ferrites is the extra iron from the erosion of the ball mills, a longer milling time corresponding to an increase in the amount of iron due to erosion.

Figure 7:
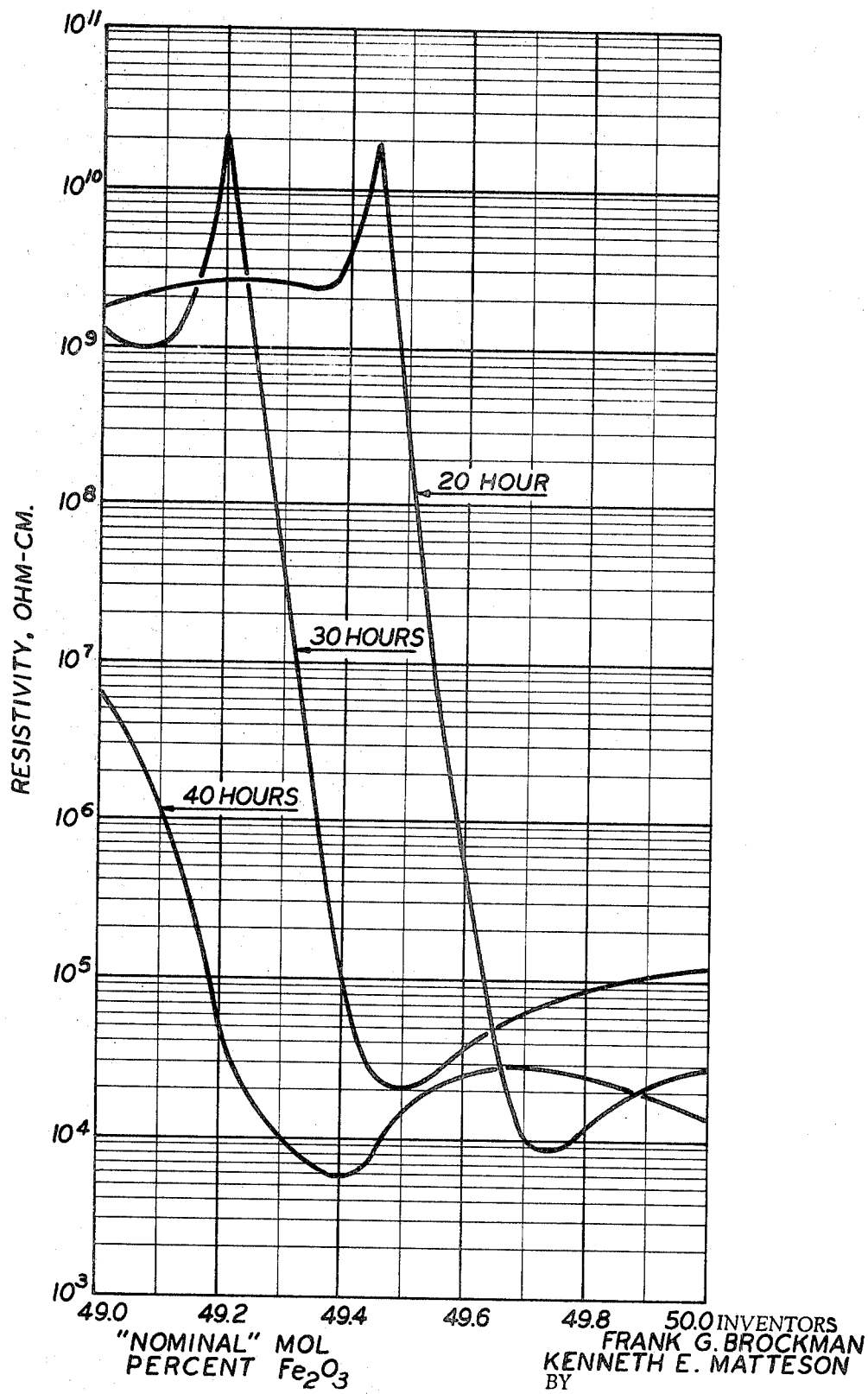
FIGS. 7, 8 and 9 show respectively the relationship of milling time and resistivity, $\mu Q$ product, and permeability.
Figure 8:
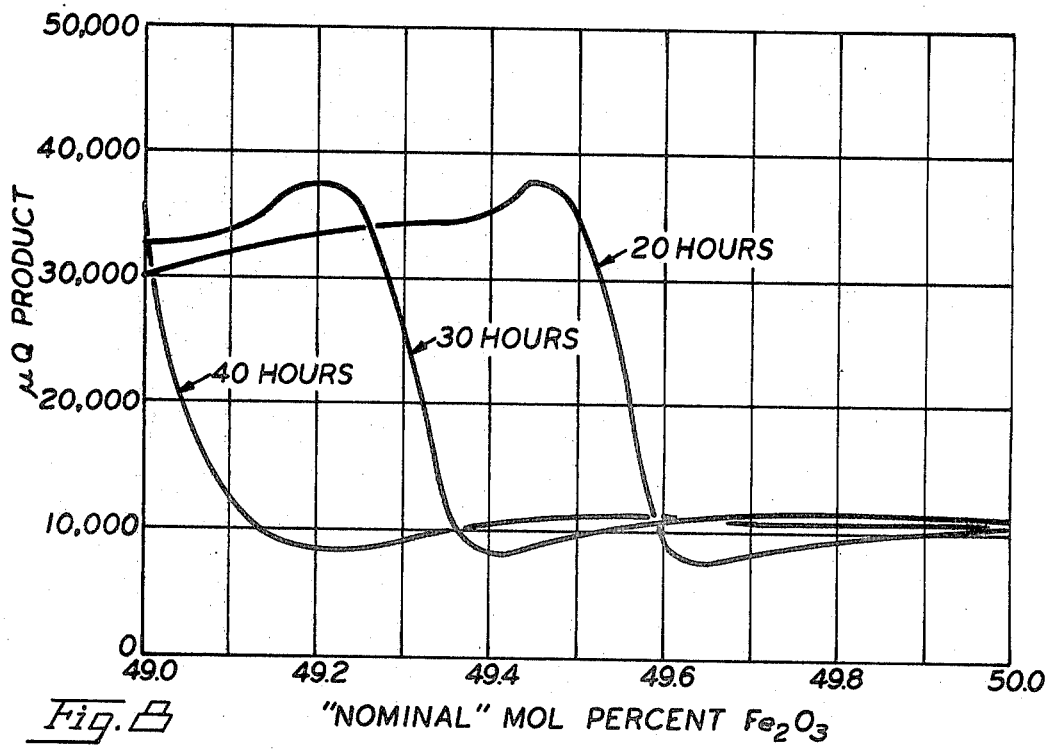
Figure 9:
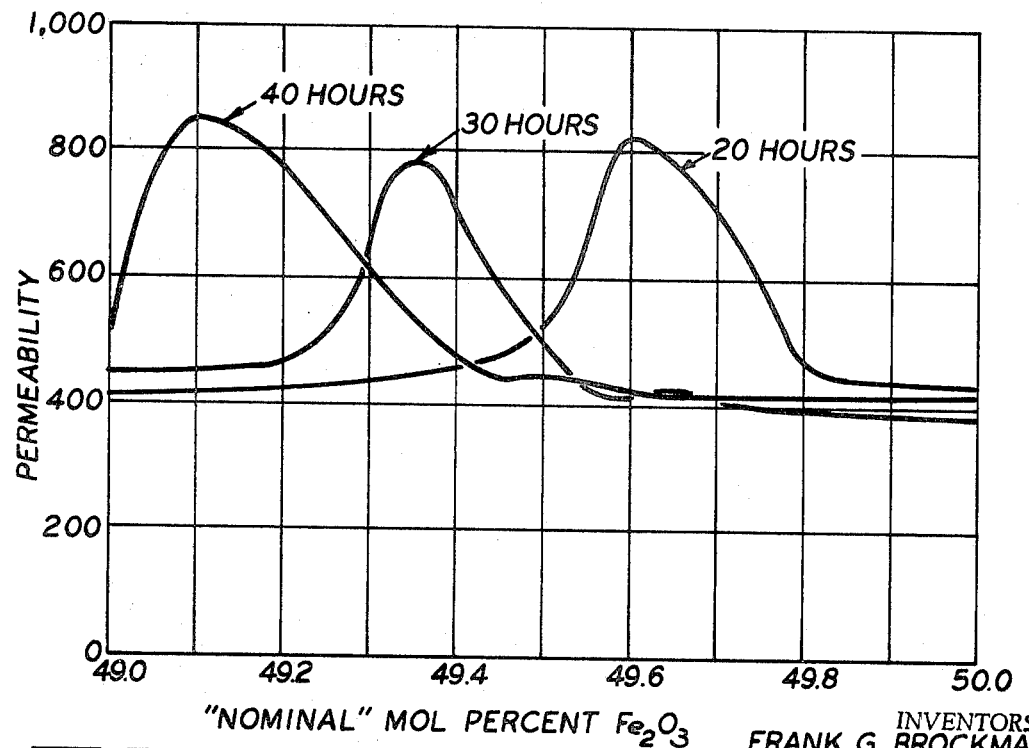

This is shown in FIGS. 7, 8, and 9 which show, respectively, the resistivity, $\mu Q$ product at 1.5 mc./s. and permeability as a function of "nominal" mol percent of ferric oxide for milling 20, 30 and 40 hours respectively.

Figure 10:
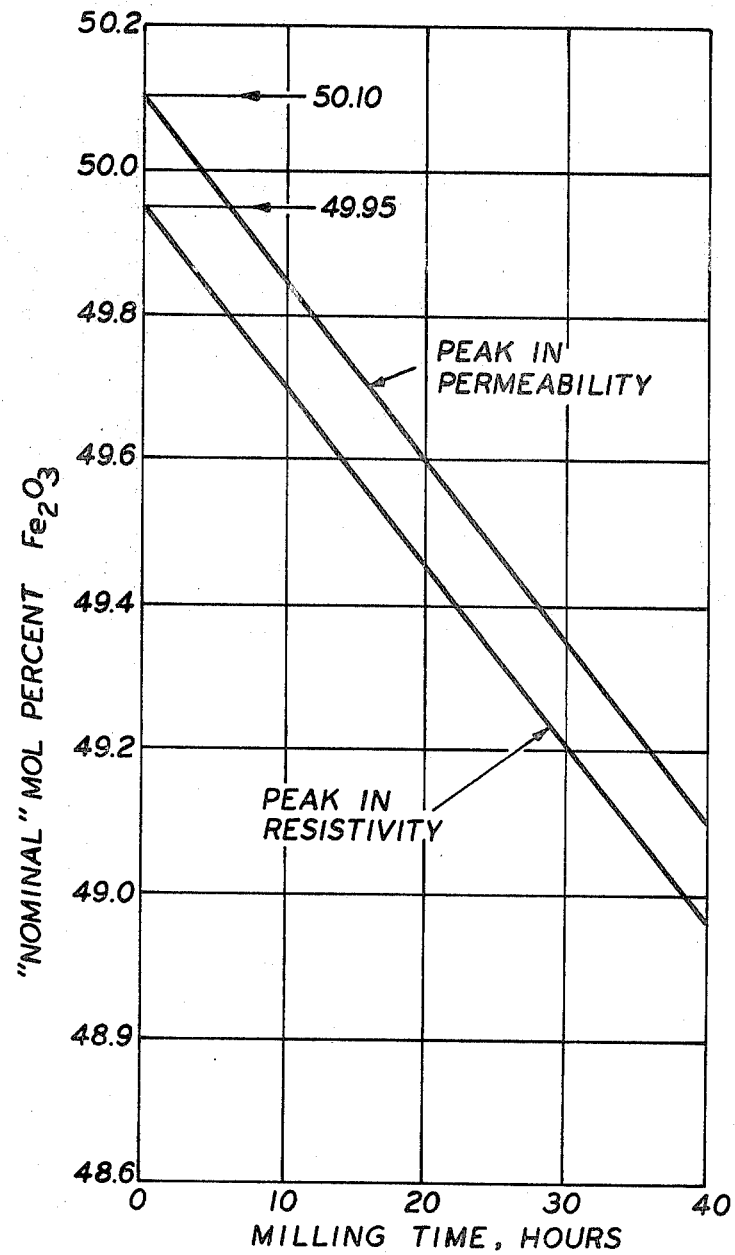
FIG. 10 shows the relationship between milling time and peak resistivity and peak permeability.

It is an incidental result of this invention that the true mol percentage of ferric oxide can be derived from these results. This is accomplished by plotting the "nominal" mol percentage of ferric oxide for (a) peak resistivity and (b) the peak permeability against the milling time in hours and extrapolating the resulting two straight lines to zero time as shown in FIG. 10. The true mol permentage of ferric oxide for the maximum resistivity (and also in the $\mu Q$ product) is found to be 49.95 mol percent. However, uncertainties in the chemical analyses are typically about 5 parts in a thousand and this figure is thus subject to this uncertainty. The maximum permeability (but in $\mu Q$ product) occurs at a true mol percentage of ferric oxide of 50.10, subject also to the uncertainties associated with chemical analyses.

Having established in this example that the optimum "nominal" mol percentage of ferric oxide is 49.45 (when the milling time is 20.0 hours), it is possible to make the optimum composition directly without recourse to the Fine Scale Blending Technique as follows: a batch of the raw materials was prepared to yield directly the optimum (49.45) "nominal" mol percent of ferric oxide. The milling time was 20.0 hours. Table II compares the properties of a sample made from this single batch and the properties of the samples obtained by Fine Scale Blending Techniques.

TABLE II

[Properties of 49.5 "nominal" mol percent Fe₂O₃: (a) by fine scale blending technique; and (b) in a single batch]

| | Sample No. | Density, g./cc. | $\mu$ | $\mu Q$ |
|---|---|---|---|---|
| (a) Blend | 1921 | 5.14 | 480 | 40,000 |
| (b) Single batch | 1940 | 5.15 | 465 | 39,000 |

EXAMPLE III

The nickel zinc ferrite in this example had a nickel to zinc ratio higher than those in Examples I and II, being 50/50. The two compositions prepared for the "Fine Scale Blending Technique" were:

| | "Nominal" mol percent | | |
|---|---|---|---|
| | NiO | ZnO | Fe₂O₃ |
| Composition No. 1 | 25.5 | 25.5 | 49.00 |
| Composition No. 2 | 25.0 | 25.0 | 50.00 |

Using the procedures given under Example I, a series of toroidal samples were prepared from a "nominal" mol percentage of ferric oxide of 49.00 to a "nominal" mol percentage of ferric oxide of 50.00 The procedures differed only in the final firing temperature. In this case it was 1185° to 1175° C.

The troids were measured in the same manner as in Example I, excepting that the permeabilities and the Q's were measured at 1.5 mc./s. FIG. 3 shows the resistivity as a function of the "nominal" mol percentage of ferric oxide. FIG. 2 shows the permeability and the $\mu Q$ product (at 1.5 mc./s.) as functions of the "nominal" mol percentage of ferric oxide.

As in Examples I and II, the $\mu Q$ product and the resistivity are maxima at the same "nominal" mol percentage of ferric oxide.

Because cobalt ferrite has a large positive magnetocrystalline anisotrophy and nickel-zinc ferrites have a negative magnetocrystalline anisotropy, theory predicts that a zero in anisotropy can result if a small percentage of cobalt ferrite is incorporated in solid solution with a nickel-zinc ferrite. A zero in anisotropy is expected to enhance the magnetic properties of the ferrite. At the present state of knowledge, the optimum amount of cobalt ferrite for any one nickel-zinc ferrite can not be predicted.

The Fine Scale Blending Technique has been adapted to this problem in the following manner.

In Example III it is shown that the $\mu Q$ product and the resistivity of Ni/Zn 50/50 are at maxima at the "nominal" mol percentage of Fe₂O₃ of 49.40, under the conditions of fabrication described.

Two compositions were prepared so that this 49.40 "nominal" mol percentage of ferric oxide was maintained as follows:

| | "Nominal" mol percent | | | |
|---|---|---|---|---|
| | CoO | NiO | ZnO | Fe₂O₃ |
| Composition No. 1 | 0 | 25.30 | 25.30 | 49.40 |
| Composition No. 2 | 1.00 | 24.80 | 24.80 | 49.40 |

These two compositions were processed as described under Example I, and, using the procedures given there, a series of toroidal samples were prepared from the "nominal" mol percentage of CoO of zero, to a "nominal" mol percentage of CoO of 1.00. In these samples the compositions vary along the constant "nominal" mol percentage of ferric oxide of 49.40 with the CoO content varied between the limits zero and 1.00 "nominal" mol percent. The final firing temperature of these samples was the same as in Example III, viz 1185° to 1175° C.

Figure 5:
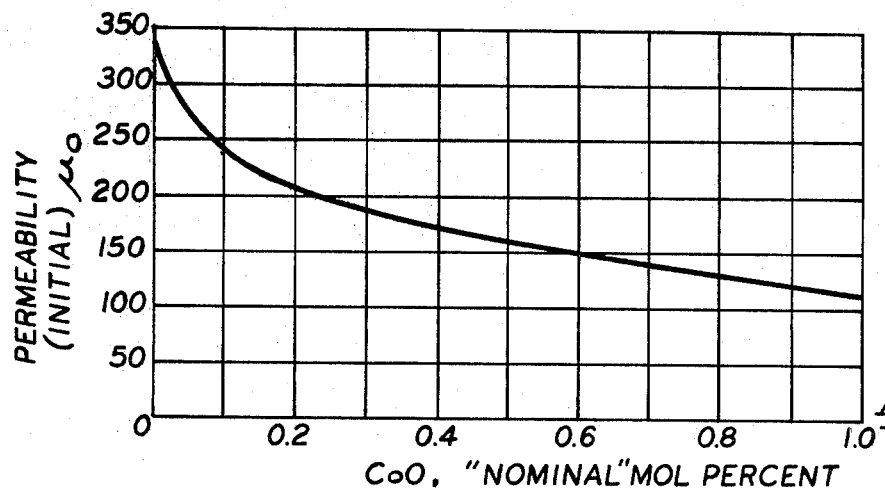
FIGS. 5 and 6 show the relatioship between permeability and $\mu Q$ product respectively and one constituent of another composition.
Figure 6:
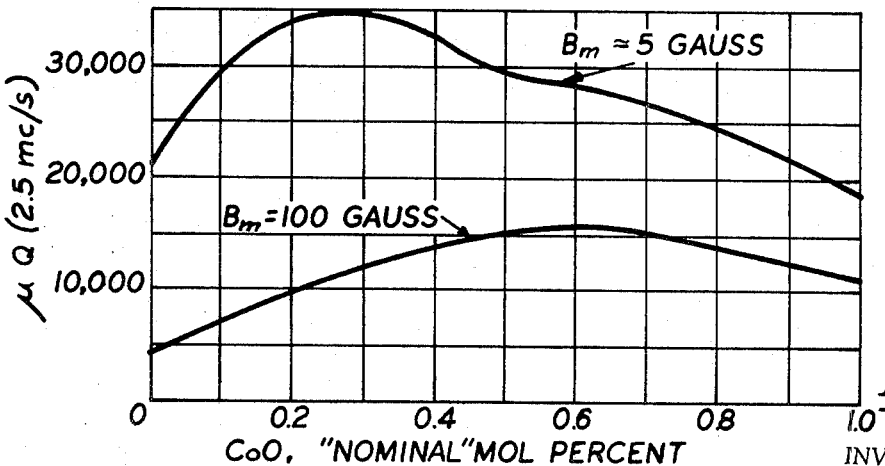

The toroids were measured in the same manner as in Example I, excepting that the permeabilities and the Q's were measured at 2.5 mc./s. In addition to Q meter measurements, measurements were made also of the permeabilities and Q's at elevated flux densities at 2.5 mc./s. FIG. 5 shows the values of permeability ($\mu$) and FIG. 6 the $\mu Q$ product as a function of the CoO "nominal" mol percent.

Therefore, while the invention has been described with reference to specific embodiments, other modifications will be apparent to those skilled in this art without departing from the spirit and scope of the invention as defined in the appended claims.

What is claimed is:

1. In the process of manufacturing a nickel-zinc ferrite having a maximum $\mu Q$ product and a maximum resistivity in which nickel, cobalt, zinc and ferric oxides are mixed, prefired at a temperature of about 900° C., ground in a steel ball mill for a fixed period of time, pressed into bodies and fired at about 1100° to 1200° C. for ten hours to form the ferrite, the steps of preparing two mixtures one having a deficiency (based on the numbers of mols of the initial oxides) in Fe₂O₃ corresponding to 49.0 mol percent of the mixture and the other having 50.0 mol percent of Fe₂O₃ and blending the mixtures to form a series of composite bodies having Fe₂O₃ contents from 49.0 mol percent to 50.0 mol percent, measuring the resistivities and $\mu Q$'s to determine the mol percent of Fe₂O₃ which produces bodies having the highest resistivity and $\mu Q$ product, and thereafter manufacturing nickel-zinc ferrite bodies using the same processing steps using the mol percent Fe₂O₃ found in the series of blended mixtures to produce the highest resistivity and $\mu Q$ product.

2. A process as claimed in claim 1 in which the molar ratio of NiO/ZnO is 32/68 and the firing temperature is between 1135° C. and 1145° C.

3. A process as claimed in claim 1 in which the molar ratio of NaO/ZnO is 43/57 and the firing temperature is between 1165° and 1175° C.

4. A process as claimed in claim 1 in which the molar ratio of NiO/ZnO is 50/50 and the firing temperature is between 1175° and 1185° C.

5. A process as claimed in claim 1 in which the molar ratio of CoO/NiO/ZnO is between 0/25/25 and 1/24.5/24.5 and the firing temperature is between 1175° and 1185° C.

References Cited

UNITED STATES PATENTS

| | | | |
|---|---|---|---|
| 2,736,708 | 2/1956 | Crowley et al. | 252—62.62 |
| 3,020,426 | 2/1962 | Vanderbrugt | 252—62.62 |
| 3,032,503 | 5/1962 | Sixtus et al. | 252—62.62 |
| 3,344,072 | 9/1967 | Akashi et al. | 252—62.62 |
| 3,472,780 | 10/1969 | Stuijts | 252—62.62 |

TOBIAS E. LEVOW, Primary Examiner

R. D. EDMONDS, Assistant Examiner